United States Patent [19]

Bahr et al.

[11] Patent Number: 4,536,876
[45] Date of Patent: Aug. 20, 1985

[54] SELF INITIALIZING PHASE LOCKED LOOP RING COMMUNICATIONS SYSTEM

[75] Inventors: Richard G. Bahr, Framingham; Thomas C. Hogan, Natick, both of Mass.

[73] Assignee: Prime Computer, Inc., Natick, Mass.

[21] Appl. No.: 579,088

[22] Filed: Feb. 10, 1984

[51] Int. Cl.³ .................... H04J 3/00; H04J 3/06
[52] U.S. Cl. ............................... 370/86; 370/103
[58] Field of Search ............... 370/85, 86, 87, 100, 370/103; 375/81, 82

[56] References Cited

U.S. PATENT DOCUMENTS

| | | | |
|---|---|---|---|
| 3,302,114 | 1/1967 | Hertog | 325/30 |
| 3,597,552 | 8/1971 | Goto | 179/15 BS |
| 3,729,586 | 4/1973 | Chow | 178/69.5 R |
| 3,836,956 | 9/1974 | Cross | 340/146.1 AB |
| 3,898,388 | 8/1975 | Goodwin | 179/15 BS |
| 3,938,082 | 2/1976 | Schowe, Jr. | 340/146.1 D |
| 4,002,842 | 1/1977 | Meyr et al. | 370/86 |
| 4,042,783 | 8/1977 | Gindi | 370/86 |
| 4,064,486 | 12/1977 | Faber | 340/147 SY |
| 4,302,831 | 11/1981 | Zemanek | 375/111 |

Primary Examiner—Douglas W. Olms
Assistant Examiner—Frank M. Scutch, III
Attorney, Agent, or Firm—Lahive & Cockfield

[57] ABSTRACT

A communications network including a plurality of terminals coupled together to provide a unidirectional communications ring. Each of the terminals is coupled in series along the ring. Each terminal is adapted to transmit (at an associated data rate) a digital signal to the next downstream terminal on the ring. Each terminal is adapted to receive a digital signal at the data rate associated with the next upstream terminal. The received digital signal is applied to a phase locked loop characterized by a hold time which exceeds its lock time. The phase locked loop extracts a local timing signal for re-clocking the received digital signal. The transmission time of N bits is less than the hold time of the phase locked loop. Each terminal monitors the re-clocked signal to identify when same valued consecutive bits are received for a period less than the phase locked loop hold time, and upon such detection to cause that terminal to generate at least one transition.

9 Claims, 5 Drawing Figures

SELF INITIALIZING PHASE LOCKED LOOP RING COMMUNICATIONS SYSTEM

REFERENCE TO RELATED APPLICATION

The subject matter of this application is related to the subject matter in our U.S. patent application Ser. No. 466,110, entitled "Ring Communications System", filed Feb. 14, 1983, and in U.S. patent application Ser. No. 579,198 of Thomas C. Hogan, entitled "Clock Recovery Apparatus and Method For a Ring-type Data Communications Network", filed on even date herewith. Those applications are incorporated herein by reference.

BACKGROUND OF THE INVENTION

The present invention is in the field of data communications, and more particularly, relates to the initialization and maintenance of synchronization of terminals in ring communications systems.

Ring communications networks generally include a plurality of terminals coupled in series along a unidirectional signal path. In such communications rings, any of the terminals coupled to the ring may transmit or receive digital signals on the ring according to a ring protocol. In the unusual cases where the terminals are all geographically close together, it is a relatively simple matter to synchronize all the terminals, for example, by providing the clock (or timing) signals for use at the respective terminals from a common oscillator. However, in a more typical ring network environment, there is no readily accesible master oscillator. To achieve inter-terminal synchronization in such systems, timing information is added to the transmitted data, and the terminals coupled to the ring are adapted to use this information to maintain synchronization. The incorporated reference discloses a particularly advantageous method for maintaining synchronization for a ring communications network where each terminal is adapted to transmit its data at its own associated data rate which may vary or drift independently from the data transmission rates of the other terminals coupled to the ring.

Such ring networks are effective in maintaining synchronization between terminals coupled to the ring, and permit the establishment of interterminal communications while that synchronization is maintained. However, those networks (particularly those using a phase locked loop for extracting timing information from incoming data) are vulnerable to system outages upon lack of synchronization (which generally occurs upon system power-up) or loss of synchronization (which might occur due to signal inactivity, i.e., no data level transitions in the incoming data for sufficiently long period for the phase locked loop to lose lock). Thereafter, to regain synchronization, and permit the re-establishment of communications links, a relatively long re-synchronization process must be accomplished.

SUMMARY OF THE INVENTION

Briefly, the present invention is directed to a communications system including a plurality of terminals coupled together to provide a unidirectional communications ring. Each of the terminals is coupled in series along the ring. Each terminal is adapted to transmit at an associated transmit data rate (1/T) a digital signal to the next downstream terminal on the ring. In the various forms of the invention, the transmit data rates may be maintained the same for all the terminals (for example, where a single master oscillator controls all transmit data rates or where the terminals mutually track each other's transmit data rates), or may vary independently from terminal to terminal (for example, where independent oscillators at the respective terminals may drift).

The transmitter portions of the terminals are operative in a first state to transmit run length limited digital signals having fewer than N consecutive bits having the same value. The transmitter portions are operative in a second state to transmit digital signals having N+A consecutive bits having the same binary value, followed by at least one bit having the other binary value.

Each of the terminals is adapted to receive a digital signal at the data rate associated with the next upstream terminal. The received digital signal is applied to a phase locked loop characterized by a hold time (H) which exceeds its acquisition of lock time (L). In accordance with the invention, $(N+A) \times T$ is less than H, where T is the bit period and A is greater than or equal to 0. The phase locked loop generates a receive (Rx) clock signal from the received digital signal. The receiver portion of each terminal further includes a shift register for re-clocking the received digital signals with, or in response to, the Rx clock signal.

A controller at each terminal monitors the re-clocked digital signals to detect signal level transitions. The controller is operative when N consecutive bits of the re-clocked digital signals have the same binary value, to control the transmitting portion to be in its second state for a period equal to $(N+A+M) \times T$. Otherwise, the controller maintains the transimitter portion in its first state.

In one form of the invention, $M \times T$ is greater than the lock time L of the phase locked loop, and the transmitter portion is further operative in its second state following the transmission of the N+A consecutive same binary value bits, to transmit M consecutive bits having a pattern of bit values characterized by a time-density of signal level transitions above a predetermined threshold. By way of example, a succession of bits having a pattern of alternating bit values would provide a maximum time-density of transitions in an NRZ coded system, although some lesser threshold might alternately be used.

With this configuration, each terminal thus determines when the incoming signal activity is at a low threshold level (i.e., N consecutive "no-transitions"). Upon such a determination, the terminal then transmits at its characteristic transmission rate at least one additional "no-transition" bit (to ensure that the next downstream terminal recognizes the error state) followed by an M bit preamble having a sufficient time density of transitions to meet the threshold criterion for transition density. When M is greater than L, the M transitions assure that lock is quickly achieved at power-up or following loss-of-lock situations.

By properly selecting a value for N so that $N \times T$ is less than the "hold" time of the phase locked loop, it is assured that the phase locked loop at the terminal does not lose lock. In preferred forms of the invention, the additional A bits add a margin of error to the $N \times T$ threshold determination to ensure that a downstream terminal recognizes the error state.

In alternative configurations, M may be equal to 1. In this configuration, the system according to the invention only provides resistance to loss of lock when long periods of data inactivity are detected at the terminal input. There is no set of transitions provided to re-lock or initiate lock of the respective phase locked loops.

In one form of the invention, the phase locked loop of the receiver portion of a terminal includes an oscillator having a characteristic frequency $F_o$ and an associated multiphase clock signal generator, which provides, for example, P clock signals at the frequency $f_o$, each of the P clock signals being shifted in phase by 1/P cycles with respect to another of the P clock signals. A clock selector (e.g., a muliplexer) selects one of these P clock signals to be the Rx clock signal. A first phase detector generates a first error signal representative of the relative phase shift between the received digital signal at the terminal and the one of the P clock signals shifted in phase by +1/P cycles from the current Rx clock signal. A second phase detector generates a second signal representative of the relative phase shift between the received digital signal at the terminal and the one of the P clock signals which is shifted in phase by −1/P cycles with respect to the current Rx clock signal. The clock selector is responsive to the first and second error signals to select as a new Rx clock signal the one of the P clock signals shifted by +1/P cycles in phase with respect to the current Rx clock signal when the first error signal exceeds a predetermined threshold, and the one of the P clock signals shifted by −1/P cycles in phase with respect to the current Rx clock signal when the second error signal exceeds the predetermined threshold. In this manner, the phase locked loop generates an appropriate Rx clock for re-clocking the data through the shift register at approximately the midpoint of bits in the received digital signal.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
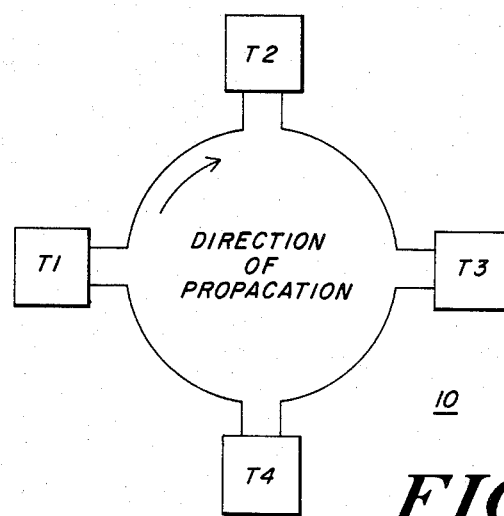
FIG. 1 shows in block diagram form, an exemplary ring communications network embodying the present invention.

FIG. 1 shows a communication network 10 in accordance with the present invention. The exemplary network 10 includes four terminals T1, T2, T3, and T4 coupled in series along a unidirectional signal path to form a communications ring. Each of the terminals includes an input port and an output port. The input port of each terminal is coupled to the output port of the upstream terminal and the output port of each terminal is coupled to the input port of the next downstream terminal.

The present embodiment is particularly adapted to a system in which the digital signals passed from terminal to terminal on network 10 include a succession of data packets interleaved with an associated succession of synchronization packets. The various terminals may include additional networks for generating the data packets, transmitting those packets between terminals on the ring, and removing those packets from the ring, for example, using conventional token passing ring network techniques.

Figure 2:
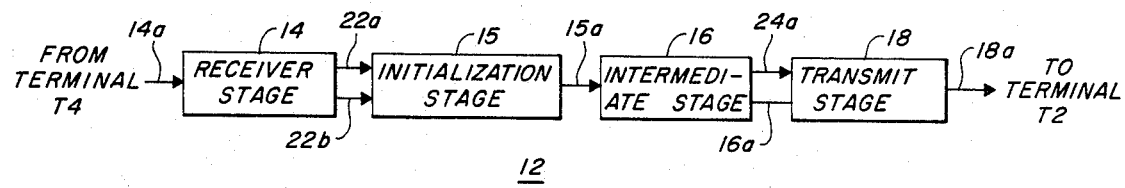
FIG. 2 shows in block diagram form, a synchronization/initialization network in one exemplary terminal of the ring communications network of FIG. 1.
Figure 3:
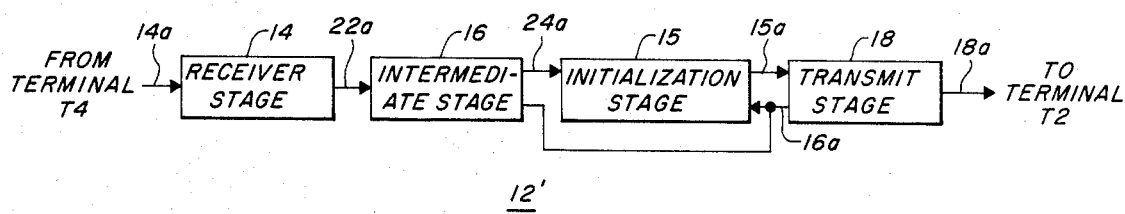
FIG. 3 shows in block diagram form an alternative synchronization/initialization network for a terminal in the ring communications network in FIG. 1.

FIG. 2 shows a synchronization/initialization network 12 in terminal T1 which is similar to corresponding networks in terminals T2–T4. The remaining portions of terminal T1 (for example, devices adapted for interface with other equipment, access control, and the like) are not shown in FIG. 2. The network 12 includes input stage 14 coupled to the input port by way of line 14a, an output stage 18 coupled to the output port by way of line 18a, and series-coupled initialization and intermediate stage 15 and 16, respectively coupling stages 14 and 18. As shown in FIG. 2, digital signals are received by stage 14 from terminal T4 on line 14a. As described fully below, stage 14 provides reclocked digital signals on line 22a, along with a regenerated (Rx) clock signal on line 22b, to the initialization stage 15. Stage 15 provides an output digital signal on line 15a to the intermediate stage 16 which, in turn, provides a digital signal on line 24a to transmit stage 18. Transmit stage 18 transmits the digital signal from stage 16 by way of line 18a to terminal T2 using a transmit (Tx) clock signal at the transmit data rate for terminal T1. The digital signal on line 24a is provided at a clock rate related (in response to signals on line 16a) to the transmit clock rate. FIG. 3 shows an alternate configuration in which the position of the stages 15 and 16 are interchanged and where those stages are the same, except for the stage 15 which uses the Tx clock signal in place of the Rx clock signal for clocking the digital signals.

Figure 4:
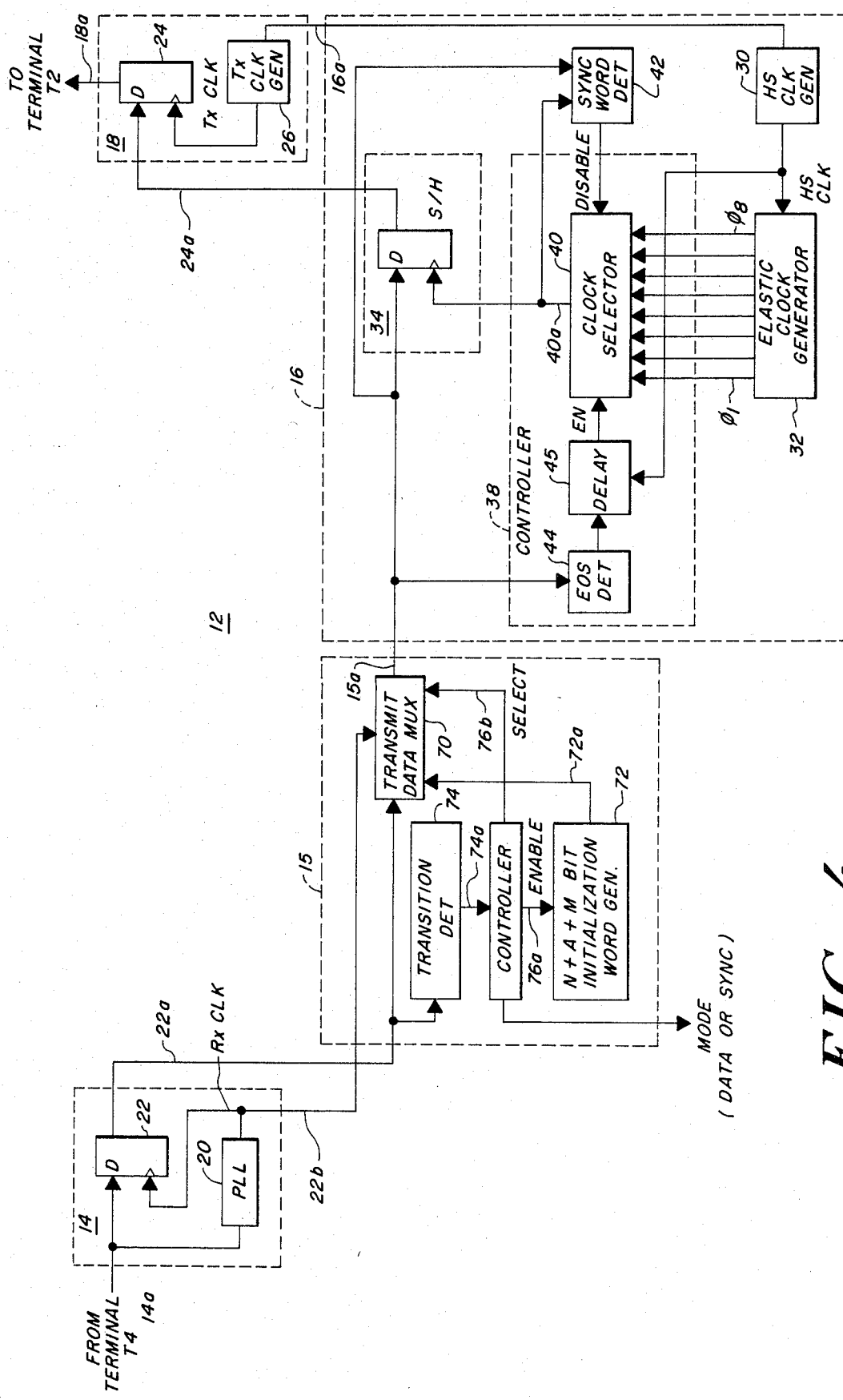
FIG. 4 shows, in detailed block diagram form, the synchronization/initialization network of FIG. 2.

FIG. 4 shows a detailed block diagram of the network 12 of FIG. 2. As shown in FIG. 4, the input stage 14 includes a phase locked loop (PLL) clock recovery network 20 and a shift register 22. The PLL network 20 extracts a receive (Rx) clock signal from the signal on line 14a received from terminal T4. The Rx clock signal is applied to shift register 22 to regenerate (i.e. re-clock) the data signal applied by way of line 14a in synchronization with the extracted Rx clock signal. This regenerated data signal (on line 22a ) and the Rx clock signal (on line 22b) are applied to the initialization stage 15.

Figure 5:
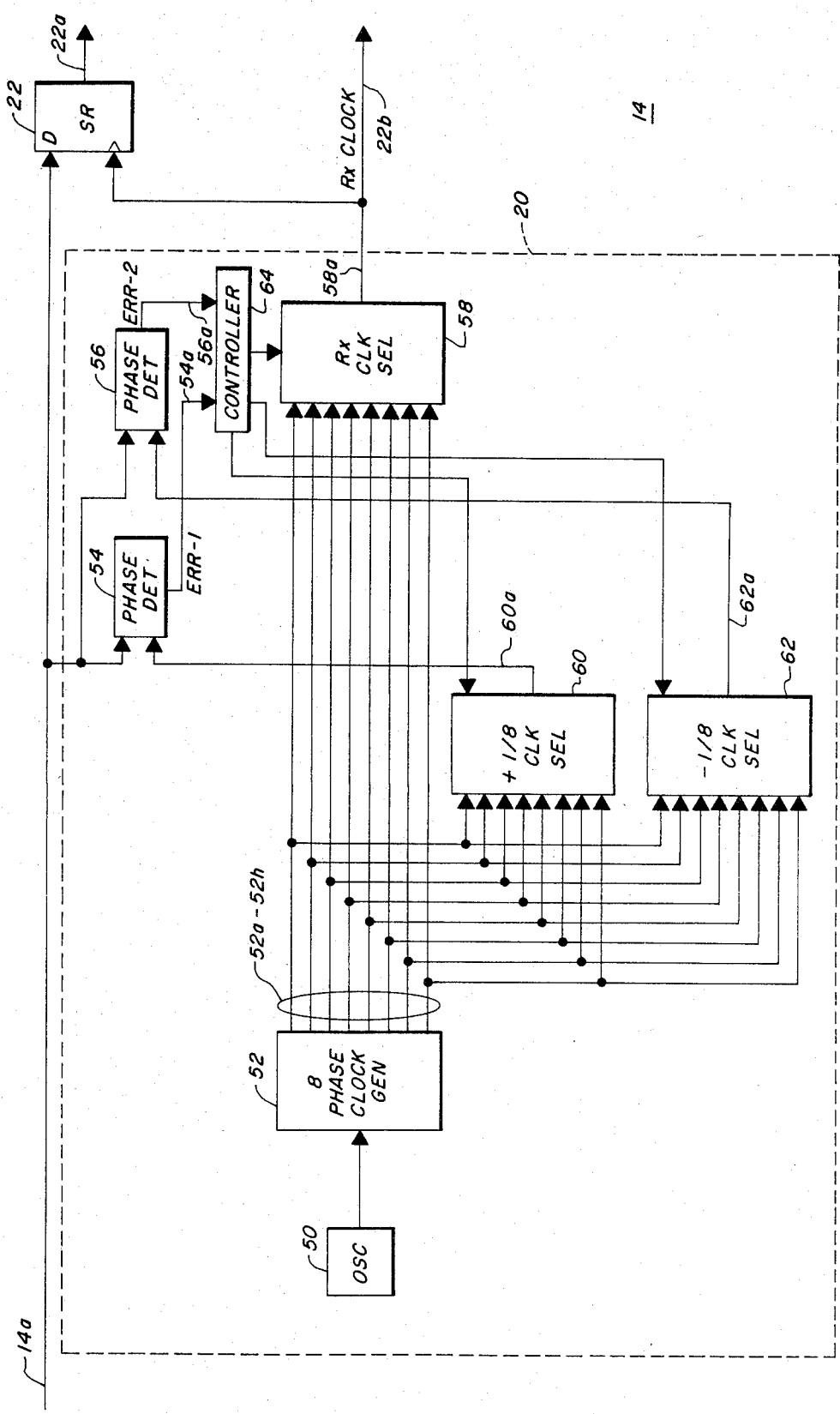
FIG. 5 shows, in detailed block diagram form, the receiver stage of the synchronization/initialization network of FIG. 4.

Phase locked loop (PLL) 20 and shift register 22 of input stage 14 are shown in detailed form in FIG. 5. PLL 20 includes an oscillator 50 coupled to a fourphase clock generator 52, a first phase detector 54, a second phase detector 56, a Rx clock selector 58 "+ clock" selector 60, "− clock" selector 62, and controller 64.

In operation, oscillator 50 drives generator 52, which in turn generates eight clock signals on lines 52a–52h at the frequency $f_o$ of oscillator 50, where each of the signals on line 52a–52h is shifted in phase by $\pm \frac{1}{8}$ of a cycle (45 degrees) with respect to two others of those signals. In the present embodiment, selectors 60, 58 and 62 are muliplexers and the controller 64 is responsive to gate three adjacent (in phase) clock signals from lines 52a–52h to lines 60a, 58a and 62a, respectively.

Lines 14a and 52a are connected as inputs to phase detector 54, which provides an error signal (ERR-1) representative of the difference in phase of the signals on line 14a and 52a. The signal ERR-1 is applied by way of line 54a to the clock selector 58. Similarly, lines 14a and 52b are applied as inputs to the phase detector 56 which produces an error signal (ERR-2) representative of the phase difference between the signals on line 14a and 52b. The ERR-2 signal is applied by way of line 56a to clock selector 58. The four phase clock signals on lines 52a–52d are applied as inputs to clock selector 58.

Generally, controller 64 controls the clock selector 58 to provide an Rx clock on line 58a. This Rx clock is selected from one of the inputs on line 52a–52h. Controller 64 further controls selectors 60 and 62 to provide adjacent (in phase) clock signals from lines 52a–52h to detectors 54 and 56, respectively. For any current Rx clock, when the signal ERR-1 reaches a predetermined threshold value, controller 64 controls the clock selector 58 to select as the Rx clock signal the signal on one of lines 52a–52h which is shifted in phase by $+\frac{1}{8}$ cycle (45 degrees) from the current Rx clock to make that selected signal the new Rx clock signal. At this time, selectors 60 and 62 are controlled to provide $+\frac{1}{8}$ cycle additionally shifted clock signals on lines 60a and 62a. Similarly, when the signal ERR-2 reaches a predetermined threshold value, controller 64 controls the clock selector 58 to select as the Rx clock, the signal from one of lines 52a–52h which is shifted in phase by $-\frac{1}{8}$ cycle (45 degrees) from the current Rx clock. Also, at this time selectors 60 and 62 are controlled to provide $-\frac{1}{8}$ cycle additionally shifted clock signals on lines 60a and 62a. The new Rx clock signal on line 58a is used to re-clock the digital signal on line 14a in the shift register 22. The re-clocked signal on line 22a is applied to initialization stage 15. The Rx clock is also applied to the initialization stage 15 by way of line 22b.

With this configuration, the phase locked loop 20 has a hold time (H) which exceeds its lock time (2), i.e. time to acquire lock. The lock time L for PLL 20 may be selected to be 64×T, for example, where T is the bit time. By way of example, the phase locked loop 20 of the present embodiment is defined to be "out of lock" if a phase error signal (i.e. signals ERR-1 or ERR-2) representative of a phase error of more 1/12 bit from nominal. Where the transmit clock signals may be as much as 0.01% different, in a worst case situation, there may be 1 bit drift every 10,000 bits, corresponding to a worst case 1/12 bit drift in 833 bit times, or 833×T. Thus, the hold time H corresponds to 833×T, and H is greater than L.

The initialization stage 15 includes a transmit data multiplexer (MUX) 70 which provides a digital signal on line 15a which is clocked out of MUX 70 in response to the Rx clock signal from line 22b. The re-clocked digital signal on line 22a provides a first input to MUX 70. An N+A+M bit initialization word generator 72 provides a second input to MUX 70 on line 72a. A transition detector 74 is also coupled to the line 22a to provide a signal on line 74a representative of signal level transitions of the re-clocked digital signal on line 22a. A controller 76 is coupled to line 74a and provides an enable command (by way of line 76a) to generator 72 and provides an input select command (by way of line 76b) to MUX 70.

The generator 72, when enabled, provides a serial data word on line 72a (clocked by the Rx clock signal) which includes N+A same binary value bits (where A is greater than or equal to 0), followed by an M bit sequence characterized by a time-density of signal level transitions above a predetermined threshold. In the present embodiment, the M bit sequence has alternating (i.e. 1010 ...) binary values. In various forms the length of the sequence M may be as low as 1, that is, a single bit having a binary value different from the value of the prior N+A bits.

In operation, generally, the controller 76 normally transfers the re-clocked data from line 22a to line 15a at the Rx clock rate while monitoring the time-density of signal level transitions on line 22a. When that density is below a threshold, related to the hold time of phase locked loop 20, then controlled 76 switches to a re-synchronization (sync) mode and enables the generator 72, and controls MUX 70 to couple the initialization word from line 72a to line 15a. The controller 76 provides a signal on line 76a indicative of the current mode to associated terminal equipment coupled to network 12.

More particularly, in the present embodiment, controller 76 detects a run of N consecutive same value bits on line 22a before switching from the "normal" (or data) mode to the "sync" mode. In the above example, for the phase locked loop 20 of FIG. 5, PLL 20 is characterized by a hold time (H) equal to 833×T and a lock time (L) of 64×T. In this case, N+A may be selected to be less than 833.

In the present illustrative example, M may be as low as 64 and still provide re-synchronization for an out of lock phase locked loop. However, it is preferred the M be somewhat higher than the minimum value, for example, 2 times higher, in order to allow for data corruption and loss of transitions in the M bit sequence. Where M is less than L, the network 12 does not guarantee re-synchronization of an output lock PLL, but does provide resistance to loss of lock. The above exemplary values are of course only examples, and other values may also be used in accordance with the present invention.

Stage 18 includes an output shift register 24 and a transmit clock generator 26. The transmit clock generator 26 produces a transmit ($T_x$) clock signal at a repetition rate corresponding to the predetermined transmit data rate associated with the terminal $T_1$. In the embodiment, the transmit data rate (established by the Tx clock signal) is nominally invariant and the same form terminal to terminal, although independent variations in the respective rates may occur due to drift or the like. In other forms of the inventions, the transmit data rates may be the same from terminal to terminal, for example, as established by a single master clock generator.

In the present embodiment, the shift register 24 is clocked by the Tx clock signal and a digital signal applied by way of line 24a to provide a digital signal to the downstream terminal $T_2$ at the transmit data rate associated with terminal $T_1$.

Because the present embodiment is adapted for use in a ring network where the transmit data rates may vary independently, the intermediate section 16 is incorporated to provide an adaptive synchronization of the terminals around the ring in the manner described in U.S. patent application Ser. No. 446,110. More particularly, the transmit data rate for any local terminal is related to the transmit data rate of the other system terminals. This relationship may be expressed in terms of the maximum bit length for a data packet (D) which is $D < W(1-R^2)/2R$, where R is the frequency tolerance of the local terminal bit rate ($f_{max} - f_{nom}/f_{nom}$) and W is related to the maximum phase jitter per bit ($P_{max}$) for the system, where $W = (T_o - P_{max})/T_o$, where $T_o$ is the transmit bit period. In addition, the synchronization packets have a number of bits between predetermined minimum and maximum limits, for example, 6 and 14 in the present embodiment. Thus, the synchronization packet in effect is a ten-bit word, plus or minus four bits. These limits may differ in other embodiments. Generally, the lower limit for a given nominal synchronization packet length is dependent on the probabilities in the system that successive terminals would have associated bit rates requiring the shaving off of bits of that packet down to the lower limit. The upper limit for a given nominal synchronization packet length is dependent on the probabilities in the system that successive terminals would have associated bit rates requiring the adding of bits of that packet up to the upper limit. The value chosen for the upper limit of synchronization packet length is dependent on the system throughout requirements for data in the data packets and physical media considerations.

In the embodiment of FIG. 4, the intermediate stage 16 includes a high speed clock generator 30, elastic clock generator 32, a digital sample and hold network 34 and a controller 38. The controller 38 includes a clock selector 40, a synchronization word detector 42, end-of-synch (EOS) detector 44, shift register delay 45.

In the present embodiment, the high speed clock generator 30 generates a high speed (HS) clock signal which is eight times the repetition rate of the transmit (Tx) clock signal, and synchronous with that transmit clock signal. The coupling of generator 30 to the Tx clock generator 26 is shown by line 16a of FIG. 4.

The elastic clock generator 32 is coupled to the generator 30 and produces eight elastic clock signals, $\phi_1$, $\phi_2$, ... $\phi_8$, each having a repetition rate corresponding to the transmit data rate. Each of the signals produced by the elastic clock generator 32 is shifted in time with respect to transmit ($T_x$) clock signal by a different multiple of $\frac{1}{8}$ times the period of the transmit clock signal. In other embodiments, different numbers (than eight) of signals may be produced by the clock generator which are also phased appropriately.

The clock selector 40 is adapted to select one of the elastic clock signals and apply that signal by way of line 40a to the clock input of the sample and hold network 34. Network 34 in this embodiment includes a single shift register stage having its data input coupled to line 15a and its data output coupled to line 24a. The application of a clock pulse to the clock input of shift register of network 34 produces a transfer of the binary value at the data input (i.e., line 22a) to the data output (i.e., line 24a) of that shift register.

The synchronization word detector 42 has an input coupled to the line 15a, and a clock input driven by the elastic clock signal on line 40a.

The EOS detector 44 is coupled to line 15a and is adapted to detect transitions in the data on that line. The output of detector 44 is clocked through a shift register delay 45 at the HS clock rate so that the EOP signal occurs four periods of the HS clock signal after the detected transition.

In operation, the clock selector 40 applies one of the elastic clock signals to the sample and hold network 34. The synchronization word detector 42 monitors the digital signal on line 15a. Upon detection of the synchronization packet, i.e., detecting at least six consecutive binary ones, the detector 42 generates a signal to disable the clock selector 40. As a result, an "extended binary one" is in effect produced on line 24a at this time.

Following the sync word detection by detector 42, the end-of-sync (EOS) detector 44 monitors the line 15a to detect the first transition, indicating the end of the synchronization packet. At the latter detection, EOS detector 44 and delay 45 generate an end-of-packet (EOP) signal following n/2 repetition periods of the HS clock signal. This EOP signal is applied to the enable input of clock selector 40, which in turn selects the elastic clock signal ($\phi_1$, $\phi_2$ ... $\phi_8$) which has a transition closest to the EOP signal, and applies that selected elastic clock signal to line 40a until the selector 40 is next disabled.

Until that disablement, the data packet on line 15a is clocked through element 34 in response to the selected elastic clock signal. In this manner, the composite data packets and synchronization packets from element 34 may be clocked through register 24 and to terminal $T_2$ at the $T_x$ clock rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A ring communications system comprising a plurality of terminals coupled together to provide a unidirectional communications ring, each of said terminals comprising:
   A. means for transmitting digital signals at a transmit data rate (1/T) associated with said terminal to the next downstream terminal, said transmitting means being operative in a first state to transmit run length limited digital signals having fewer than N consecutive bits having the same value, and operative in a second state to transmit digital signals having N+A consecutive bits having the same binary value, followed by at least one bit having the other binary value,
   B. means for receiving digital signals from the next upstream terminal, said receiving means including:
      i. a phase locked loop (PLL) means for generating a receive (Rx) clock signal from said received digital signal, said PLL means including a phase locked loop having a characteristic hold time (H) exceeding its characteristic lock time (L) and where (N+A)×T is less than H,
      ii. shift register means for re-clocking said received digital signals in response to said Rx clock signal
   C. control means for detecting signal level transitions in said re-clocked digital signals, and means operative when N consecutive bits of said re-clocked digital signals have the same value, for controlling said transmitting means to be in its second state for a period equal to (N+A+M)×T, where M is greater than or equal to 1, and A is greater than or equal to 0, and for controlling said transmitting means to be in its first state otherwise.

2. A ring communications system according to claim 1 further comprising means for maintaining said transmit data rates the same from terminal to terminal.

3. A ring communications system according to claim 1 further comprising means for establishing said transmit data rates whereby said transmit data rates may vary independently from terminal to terminal.

4. A ring communications system according to claims 1 or 2 or 3 where M×T is greater than or equal to L and wherein said transmitting means is further operative in said second state following said transmission of N+A consecutive same value bits to transmit M consecutive bits having a pattern of values characterized by a time-density of signal level transitions above a predetermined threshold.

5. A ring communications system according to claim 4 wherein said transmit means includes means for establishing said bit pattern to be a succession of alternating values.

6. A ring communications system according to claims 1 or 2 or 3 wherein said phase locked loop includes:
   A. means for generating P clock signals at said frequency $f_o$, each of said P clock signals being shifted in phase by 1/P cycles with respect to another of said P clock signals,
   B. controllable clock selector means for selecting one of said P clock signals as said Rx clock signal,
   C. a first phase detector including means for generating first error signal representative of the relative phase shift between said received digital signals and the one of said P clock signals shifted in phase +1/P cycles with respect to said Rx clock signal,
   D. a second phase detector including means for generating a second error signal representative of the relative phase shift between said received digital signals and the one of said P clock signals shifted in phase by −1/P cycles with respect to said Rx clock signal,
   E. controller means responsive to said first and second error signals for controlling said clock selector:
      when said first error signal becomes greater than a predetermined threshold, to select as said Rx clock signal the one of said P clock signals shifted in phase by +1/P cycles with respect to the previously selected Rx clock signal, and
      when said second error signal becomes greater than a predetermined threshold, to select the one of said P clock signals shifted in phase by −1/P cycles with respect to the previously selected Rx clock signal.

7. A ring communications system according to claim 4 wherein said phase locked loop includes:
   A. means for generating P clock signals at said frequency $f_o$, each of said P clock signals being shifted in phase by 1/P cycles with respect to another of said P clock signals,
   B. controllable clock selector means for selecting one of said P clock signals as said Rx clock signal,
   C. a first phase detector including means for generating first error signal representative of the relative phase shift between said received digital signals and the one of said P clock signals shifted in phase +1/P cycles with respect to said Rx clock signal,
   D. a second phase detector including means for generating a second error signal representative of the relative phase shift between said received digital signals and the one of said P clock signals shifted in phase by +1/P cycles with respect to said Rx clock signal,
   E. controller means responsive to said first and second error signals for controlling said clock selector:
      when said first error signal becomes greater than a predetermined threshold, to select as said Rx clock signal the one of said P clock signals shifted in phase by +1/P cycles with respect to the previously selected Rx clock signal, and
      when said second error signal becomes greater than a predetermined threshold, to select the one of said P clock signals shifted in phase by −1/P cycles with respect to the previously selected Rx clock signal.

8. A ring communications system according to claims 1 or 2 or 3 wherein said phase locked loop includes:
   a clock generator having a characteristic operating frequency for outputting said Rx clock signal,
   means for receiving said received digital signal,
   means for comparing the phase of said received digital signal and said Rx clock signal, and
   phase selection means responsive to said phase comparison means for discretely changing the relative phase difference between said received digital signal and said clock signal when said phase difference exceeds a predetermined threshold.

9. A ring communications system according to claim 8 wherein
   said clock generator comprises means for selectively outputting, in response to said phase selection means, a clock signal having one of a plurality of discrete phases.

* * * * *

UNITED STATES PATENT AND TRADEMARK OFFICE
CERTIFICATE OF CORRECTION

PATENT NO. : 4,536,876

DATED : August 20, 1985

INVENTOR(S) : Richard G. Bahr and Thomas C. Hogan

It is certified that error appears in the above-identified patent and that said Letters Patent is hereby corrected as shown below:

Column 3, line 6; "$F_o$" should read --$f_o$--.

Column 6, line 10; "controlled" should read --controller--.

Column 10, line 14; "+1/P" should read -- -1/P --

Signed and Sealed this

Eighth Day of July 1986

[SEAL]

Attest:

DONALD J. QUIGG

Attesting Officer

Commissioner of Patents and Trademarks